United States Patent
Ye et al.

(10) Patent No.: US 7,865,005 B2
(45) Date of Patent: Jan. 4, 2011

(54) ITERATIVE RECONSTRUCTION OF MULTIPLE-PEAK ISOTOPE IMAGES

(75) Inventors: Jinghan Ye, Fremont, CA (US); Mary K. Durbin, San Jose, CA (US); Xiyun Song, Mountain View, CA (US); Lingxiong Shao, Saratoga, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1015 days.

(21) Appl. No.: 11/627,087

(22) Filed: Jan. 25, 2007

(65) Prior Publication Data

US 2007/0183642 A1    Aug. 9, 2007

Related U.S. Application Data

(60) Provisional application No. 60/765,389, filed on Feb. 3, 2006.

(51) Int. Cl.
*G06K 9/00* (2006.01)
(52) U.S. Cl. ..................................... 382/131
(58) Field of Classification Search ......... 382/128–134; 128/920–930; 250/455–465; 356/39–46; 600/407–414, 424–426
See application file for complete search history.

(56) References Cited

U.S. PATENT DOCUMENTS 6,507,633 B1   1/2003   Elbakri et al.

2003/0156684 A1   8/2003   Fessler
2004/0228451 A1 *  11/2004   Wu et al. .................. 378/207
2008/0033291 A1 *  2/2008   Rousso et al. ............. 600/436

OTHER PUBLICATIONS

Kinahan, P. E., et al.; Attenuation correction for a combined 3D PET/CT scanner; 1998; Med. Phys.; 25(10) 2046-2053.
Kinahan, P. E., et al.; X-Ray-Based Attenuation Correction for Position Emission Tomography/Computed Tomography Scanners; 2003; Seminars in Nuclear Medicine; 33(3)166-179.
Platten, D.; CT issues in PET/CT Scanning-ImPACT technology update No. 4; Oct. 2004; www.impactscan.org.
Forte gamma camera system with JETStream; Philips Advertising Brochure 4535 983 03444/882; 2004.
SKYLight Nuclear Camera Platform; Philips Advertising Brochure 4535 983 03422/882; 2003.

* cited by examiner

*Primary Examiner*—Samir A Ahmed
*Assistant Examiner*—Atiba O. Fitzpatrick

(57) ABSTRACT

In an imaging method, estimated data is iteratively projected and backprojected. The iterative projecting and backprojecting includes projecting or backprojecting the estimated data along parallel paths each employing energy-dependent parameters appropriate for a different energy. During each iteration, the estimated data is adjusted based on comparison of the estimated data with measured data.

18 Claims, 2 Drawing Sheets

ITERATIVE RECONSTRUCTION OF MULTIPLE-PEAK ISOTOPE IMAGES

CROSS REFERENCE TO RELATED APPLICATIONS

This application claims the benefit of U.S. provisional application Ser. No. 60/765,389 filed Feb. 3, 2006, which is incorporated herein by reference.

BACKGROUND

The following relates to the imaging arts. It finds particular application in single photon emission computed tomography (SPECT) imaging using radioisotopes emitting at multiple energies, and will be described with particular reference thereto. However, it also finds application in SPECT imaging using more than one different radiopharmaceutical, and in other types of nuclear imaging, nuclear spectroscopy, radiation therapy, and so forth.

In SPECT imaging, one or more radiopharmaceuticals are administered to a subject, a gamma camera detects radioactive emissions from the administered one or more radiopharmaceuticals, and the detections are processed to reconstruct an image of the distribution of the one or more radiopharmaceuticals in the subject. For example, the radiopharmaceutical may include a radioisotope attached to a carrier that concentrates in a target organ or other anatomical feature of a human subject, and the reconstructed image is representative of the target organ or other anatomical feature. The administered radiopharmaceutical dosage is typically relatively low, especially in the case of human imaging subjects, and the radioactive emission detections are analyzed using statistical techniques taking into account factors such as scattering, attenuation, and detector efficiency.

If the radiopharmaceutical generates a single emission peak, the scattering, attenuation, detector efficiency, and so forth are readily accounted for using parameters characteristic of the emission energy. However, where the radiopharmaceutical generates different emission peaks (for example, if the radioisotope emits at two or more energies, or if two or more radiopharmaceuticals are used), then accounting for scattering, attenuation, and so forth is difficult. Examples of multiple-peak radiopharmaceuticals include: complexes of In-111, which has main emission peaks at 171 keV and at 245 keV; complexes of Ga-67, which has main emission peaks at 93 keV, 184 keV, and 300 keV; and complexes of Tl-201, which has main emission peaks at 72 keV and 167 keV. Examples of imaging with two or more radiopharmaceuticals at the same time include dual isotope cardiac imaging allowing a stress Tc-99m image to be acquired simultaneously with a rest Tl-201 imaging, or using Tc-99m labeled blood cells to image anatomy while simultaneously using an In-111 complex to image prostate cancer.

Reconstruction of SPECT images from radiopharmaceuticals that produce different energy peaks is complicated by the fact that photons emitted at different energies will be scattered differently, attenuated differently, have different gamma camera detection efficiencies, and so forth. In addition, photons emitted from higher energies can be down-scattered and contaminate the projection data acquired in lower energy windows.

Typically, for multiple-peak isotopes, the gamma camera acquires or bins photons at different energies in a single projection image set, and the reconstruction employs average or approximate parameter values to account for scattering, attenuation, detector efficiency, and so forth. For example, iterative reconstruction methods typically utilize a single set of projections for comparison to estimated activity maps, even if the projections include photons acquired at different energies. Attenuation, scatter, and other compensations are performed by assuming an average or summed value for specific physical properties. Although the reconstructed images are clinically usable, the averaging or approximation degrades the quantitative accuracy of the image. Moreover, if two or more different radiopharmaceuticals are administered, each targeting a functional or molecular compartment and each emitting photons at different peak energies, then reconstruction of a single projection image set does not provide readily distinguishable imaging of the different functional or molecular compartments.

BRIEF SUMMARY

According to one aspect, an imaging method is disclosed. Estimated data is iteratively projected and backprojected. The iterative projecting and backprojecting includes projecting or backprojecting the estimated data along parallel paths each employing energy-dependent parameters appropriate for a different energy. During each iteration, the estimated data is adjusted based on comparison of the estimated data with measured data.

According to another aspect, an imaging system is disclosed. A radiation detector acquires measured data from a subject after having administered to the subject a radiopharmaceutical emitting at two or more different photon energies. A reconstruction processor performs an image reconstruction process including: iteratively projecting and backprojecting estimated data, the iterative projecting and backprojecting including projecting or backprojecting the estimated data along parallel paths each employing energy dependent parameters appropriate for a different energy; and during each iteration, adjusting the estimated data based on comparison of the estimated data with the measured data acquired by the radiation detector.

According to another aspect, a reconstruction processor is disclosed, which is programmed to iteratively reconstruct an image from measured data. Each iteration includes: (i) projecting or backprojecting estimated data along parallel paths each employing energy-dependent parameters appropriate for a different energy; and (ii) adjusting the estimated data based on comparison of the projected or backprojected estimated data with measured data.

According to another aspect, a digital storage medium is disclosed. The digital medium encodes instructions which when executed by a processor perform reconstruction processing operations including (i) projecting or backprojecting estimated data along parallel paths each employing one or more energy-dependent parameters appropriate for a different energy and (ii) adjusting the estimated data based on comparison of the projected or backprojected estimated data with measured data.

According to another aspect, an imaging method is disclosed. Projection data are received from an isotope which emits a first percentage of its emitted radiation at a first energy peak and a second percentage of its emitted radiation at a second energy peak. An image estimate is forward projected. The forward projected image estimate is operated on in accordance with the first energy percentage and at least one of a first energy-dependent scattering correction, a first energy-dependent attenuation correction, and a first energy-dependent detector efficiency coefficient to generate a first energy corrected projected image estimate. The forward projected image estimate is operated on in accordance with the second energy percentage and at least one of a second energy-dependent scattering correction, a second energy-dependent attenuation correction, and a second energy-dependent detector efficiency coefficient to generate a second energy corrected projected image estimate. The received projection data are compared with a combination of the first and second energy corrected projected image estimates to generate an estimated image correction. The estimated image is corrected with the estimated image correction.

One advantage resides in improved image reconstruction accuracy.

Another advantage resides in more accurately accommodating reconstruction of measured radioemission data having two or more energy peaks.

Another advantage resides in facilitating imaging using a wider range of radiopharmaceuticals having complex multi-energy peak radioemission spectra.

Numerous additional advantages and benefits will become apparent to those of ordinary skill in the art upon reading the following detailed description of the preferred embodiments.

BRIEF DESCRIPTION OF THE DRAWINGS

The invention may take form in various components and arrangements of components, and in various process operations and arrangements of process operations. The drawings are only for the purpose of illustrating preferred embodiments and are not to be construed as limiting the invention.

DETAILED DESCRIPTION OF THE PREFERRED EMBODIMENTS

Figure 1:
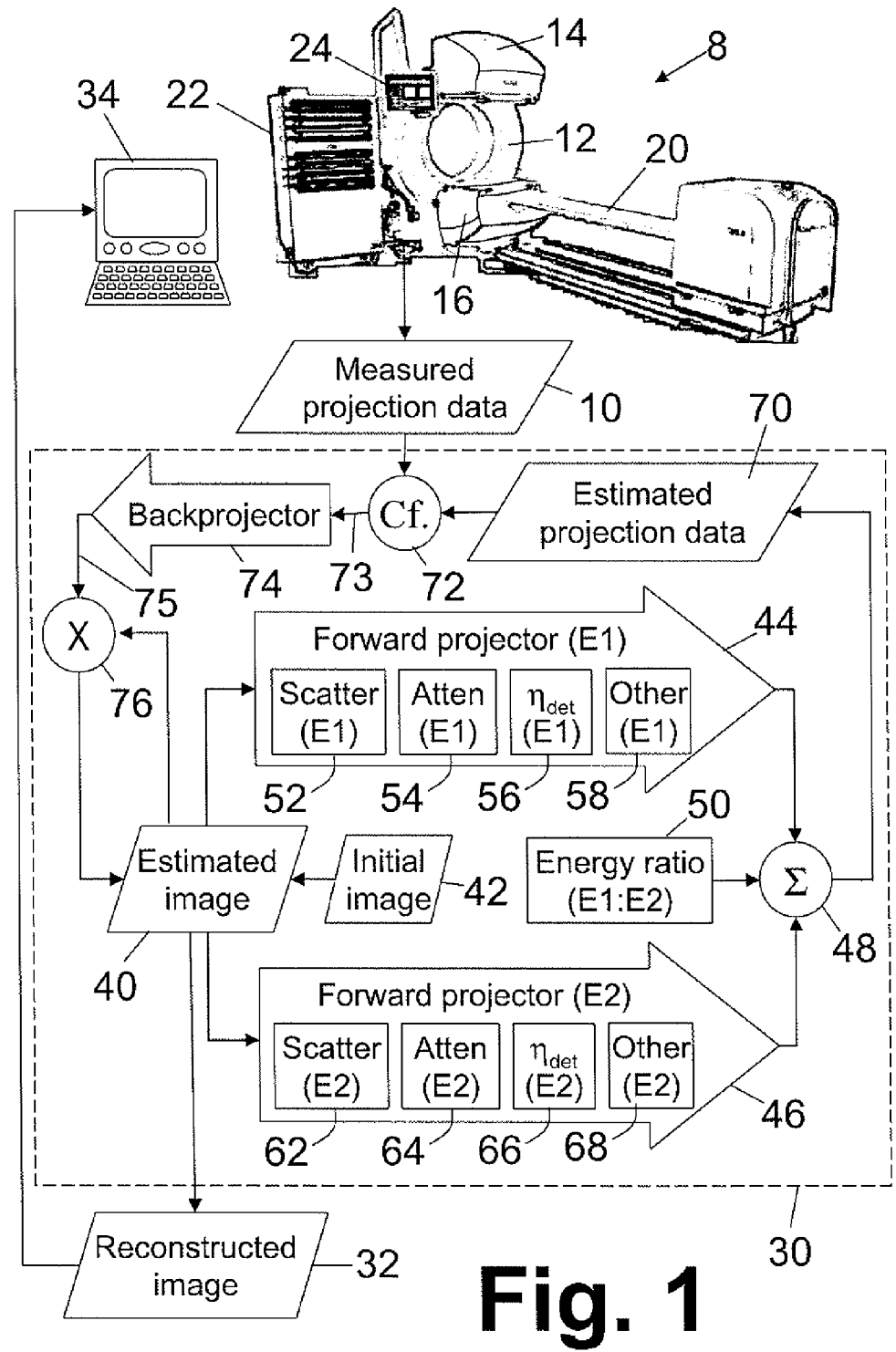
FIG. 1 shows an imaging system including a gamma camera for acquiring measured data and a diagrammatically represented reconstruction processor for performing iterative image reconstruction of the measured data taking into account multiple emission energy peaks.

With reference to FIG. 1, a radiation detector, such as an example illustrated gamma camera 8, acquires measured projection data 10. The illustrated example gamma camera 8 is a Forte™ gamma camera (available from Philips Medical Systems, having a U.S. office in Milpitas, Calif.) including a rotatable gantry 12 supporting two radiation detector heads 14, 16 with suitable mechanics for providing tomographic imaging, a support 20 for supporting an imaging subject in view of the detector heads 14, 16, a collimator rack 22 for storing one or more collimators configured for mounting on the detector heads 14, 16, and a monitor 24 and other electronics for controlling the gamma camera 8 to execute tomographic or other imaging modalities. The illustrated Forte™ gamma camera 8 is an example—substantially any type of gamma camera can be used for acquiring the measured data.

In some embodiments, for example, robotic arms may be used in place of the rotatable gantry 12. One suitable example gamma camera employing robotic arms is the Skylight™ gamma camera (also available from Philips Medical Systems). Both the illustrated Forte™ gamma camera 12 and the Skylight™ gamma camera employ two detector heads—however, gamma cameras employing one, two, three, four, or more detector heads are also suitable. In some embodiments, fixed radiation detectors are employed rather than the illustrated movable detector heads 14, 16. As noted, these are merely illustrative examples. The imaging systems, image reconstruction processors, and imaging techniques disclosed herein can be practiced in conjunction with substantially any type of gamma camera as well as with other types of radiation detectors for acquiring measured projection data. For example, the imaging systems, image reconstruction processors, and imaging techniques disclosed herein can be practiced in conjunction with a SPECT/PET system that provides both SPECT and positron emission tomography (PET) capabilities.

The gamma camera 8 or other radiation detector is employed to acquire the measured projection data 10. Typically, a collimator is used in conjunction with the detector head to detect radiation events originating along identifiable linear or narrow-angle projection paths. The radiation events are generated by one or more radiopharmaceuticals administered to an imaging subject disposed on the support 20 or otherwise arranged to be viewed by the detector heads 14, 16. The radiopharmaceuticals each include one or more radioisotopes attached to a suitable carrier complex or molecule that disperses into the subject. In some embodiments, the subject is a human imaging subject, and each radiopharmaceutical is selected to target or accumulate in a particular anatomical feature, such as a particular organ, or in blood (so as to highlight the circulatory system), or in malignant cancer tissue, or so forth. Thus, the detected radiation events originate from the targeted anatomical feature, providing measured projection data 10 indicative of emissions originating at the target anatomical feature.

To facilitate three-dimensional imaging, the gamma camera 8 executes a tomographic sequence in which the detector heads 14, 16 orbit the imaging subject to acquire measured projection data 10 at a plurality of angular views. In some embodiments, the tomographic sequence provides a full 360° orbit of angular views, while in other embodiments, such as for certain cardiac imaging techniques, the tomographic sequence provides a reduced angular span that is less than 360°. It is also contemplated to acquire tomographic measured data using a plurality of non-moving detectors arranged in a circular or otherwise-shaped configuration around the imaging subject. In other contemplated embodiments, non-tomographic imaging may be used—for example, a single detector head may be used in fixed position or slowly moved along a linear path to acquire planar imaging data. Moreover, while the illustrated gamma camera 8 employs collimators, in other contemplated embodiments the radiopharmaceutical may emit radiation events having known geometries (such as oppositely directed 511 keV photons generated by a positron-electron annihilation event), and non-collimated detectors employing coincidence detection or another technique provide measured projection data. The term "projection data" as used herein is intended to denote any type of radiation data in which the radiation events are associated with identifiable linear or narrow-angle projection paths.

With continuing reference to FIG. 1, a reconstruction processor 30 processes the measured projection data 10 to produce a reconstructed image 32 that is displayed on a graphical user interface 34, and/or is stored digitally, printed, filtered or otherwise post-processed using suitable image processing techniques, communicated via a local digital network and/or the Internet, or otherwise utilized. To reconstruct the measured projection data 10, the reconstruction processor 30 employs an iterative reconstruction process in which estimated data is iteratively projected and backprojected, with an adjustment of the estimated data during each iteration based on comparison of the estimated data with measured data 10, until the estimated data converges to closely resemble the measure data 10.

In the illustrated example reconstruction processor 30, the iterative reconstruction starts with estimated data initially defined by an initial image 42 serving as a starting point for an estimated image 40. In some embodiments, the initial image 42 is a uniform-intensity image. Using a uniform-intensity image to define the initial estimated data has the advantage of not biasing the iterative reconstruction based on features of the initial estimated data. In other embodiments, the initial estimated data is otherwise defined, for example using a uniform set of projections, or an initial image incorporating a priori knowledge (for example, the initial image may include features corresponding to a "typical" image of a target organ).

For certain types of imaging, the radiopharmaceutical may produce emissions with more than one emission energy peak. This situation can arise, for example, if the radioisotope of the radiopharmaceutical produces radioemissions at different energies. For example, the radioisotope In-111, produces main emission peaks at 171 keV and at 245 keV. The radioisotope Ga-67 produces main emission peaks at 93 keV, 184 keV, and 300 keV. The radioisotope Tl-201, produces main emission peaks at 72 keV and 167 keV. Certain other radioisotopes also produce more than one emission peak. Additionally or alternatively, multiple radiopharmaceuticals may be administered to image different anatomy or functions, with the radioisotope from each radiopharmaceutical producing one or more main emission peaks at different energies. In such cases, the radioemissions at different energies are suitably characterized by energy-dependent parameters reflecting different scattering, attenuation, detector efficiency, and other different energy-dependent behavior of the emissions at the different energies.

To account for such energy-dependent behavior of the radioemissions, in each iteration of the iterative reconstruction process the estimated image 42 is forward projected along parallel paths 44, 46 each employing energy-dependent parameters appropriate for a different emission energy of the radiopharmaceutical. The forward projection results of the parallel paths 44, 46 are combined by a combiner 48 based on an energy ratio 50. In the illustrated embodiment, two parallel paths 44, 46 are illustrated, corresponding to two energy peaks E1, E2 of the example radiopharmaceutical. For example, the radiopharmaceutical may include isotope In-111, with E1=171 keV and E2=245 keV. In another example, the radiopharmaceutical may include isotope Tl-201, with E1=72 keV and E2=167 keV. In other embodiments, the radiopharmaceutical may produce three or more main energy peaks suitably processed using a corresponding three or more parallel paths. For example, a radiopharmaceutical including the isotope Ga-67 which produces three main emission peaks is suitably processed using three parallel forward projection paths corresponding to the main emission energies at 93 keV, 184 keV, and 300 keV.

Each of the forward projection paths 44, 46 suitably employs energy-dependent parameters appropriate the energy of that projection path. The example first forward projection path 44 corresponding to energy E1 employs: one or more scattering parameters 52 appropriate for energy E1; one or more attenuation parameters 54 appropriate for energy E1; and one or more detector efficiency ($\eta_{det}$) parameters 56 appropriate for energy E1. The first forward projection path 44 can also optionally include one or more other energy-dependent parameters 58 such as collimator response including modeling of septa penetration, lead x-ray correction due to collimator material, scatter within the detector, and so forth. Similarly, the example second forward projection path 46 corresponding to energy E2 employs: one or more scattering parameters 62 appropriate for energy E2; one or more attenuation parameters 64 appropriate for energy E2; and one or more detector efficiency ($\eta_{det}$) parameters 66 appropriate for energy E2. The second forward projection path 46 can also optionally include one or more other energy-dependent parameters 68 such as collimator response including modeling of septa penetration, lead x-ray due to collimator material, scatter within the detector, and so forth. It is to be appreciated that although the different projection paths 44, 46 each employ energy-dependent parameters appropriate for a different energy, it is possible that some of those parameters may be the same. For example, the scattering parameters 52, 62 and attenuation parameters 54, 64 may be different for energies E1 and E2, respectively, but the detector efficiencies 56, 66 may be the same for the energies E1 and E2, respectively. Optionally, the scattering parameters are adjusted take into account down-scattering. For example, if E1<E2 such that some radioemissions at energy E2 are downscattered into the E1 energy window, then the E1 scattering parameter 52 is optionally relatively increased to account for the E2 emissions down-scattered into the E1 energy window.

The combiner 48 combines the results of the forward projection energy paths 44, 46 based on the energy ratio 50. Typically, the energy ratio 50 takes into account a known ratio of radioemissions at the different energy peaks. For example, the radioisotope In-111 emits at E1=171 keV and at E2=245 keV, with an energy ratio E1:E2 of about 0.48:0.52 indicating that, statistically, every one-hundred emissions of the In-111 isotope will include about 48 photons at energy E1=171 and about 52 photons at energy E2=245 keV. Optionally, the energy ratio may be modified to account for downscattering, for example to account for a certain fraction of the E2 photons being down-scattered into the E1 energy range. The output of the combiner 48 is estimated projection data 70 that corresponds to projection data that would be acquired for the estimated image 40.

In some embodiments, certain parameter corrections may be performed after combining the results of the forward projection energy paths 44, 46. For example, if the detector efficiency correction is substantially similar for both energies E1 and E2, it is contemplated to perform a detector efficiency correction to the estimated projection data 70 at a processing point subsequent to the combiner 48.

The estimated projection data 70 is compared with the measured projection data 10 by a comparator 72 to produce error projection data 73 that is backprojected by a backprojector 74 to generate an image error correction data 75 that is used to adjust the estimated image 40. In the illustrated embodiment, the comparator 72 ratios the estimated projection data 70 and the corresponding measured projection data 10 to produce the error projection data 73. If the estimated projection data 70 is precisely identical to the measured projection data 10, then the ratio is consistently unity, such that the generated image correction 75 is a uniform value of unity (indicating no correction needed). On the other hand, where the estimated projection data 70 and the corresponding measured projection data 10 differ, the ratio will deviate from unity, which after processing by the backprojector 74 indicates areas where the estimated image 40 needs to be adjusted. In the illustrated embodiment, the adjustment is suitably made by an adjuster 76 that multiplies on a per-pixel or per-voxel basis the estimated image 40 and the image correction data 75. Thus, where the estimated projection data 70 and the corresponding measured projection data 10 are identical, the image correction data 75 have unity values and the adjuster 76 does not adjust the image. On the other hand, where the estimated projection data 70 and the corresponding measured projection data 10 differ, the image correction data 75 deviate from unity values so that the adjuster 76 multiplicatively produces a suitable image adjustment. The adjusted estimated image 40 then becomes the basis for the next iteration of the iterative reconstruction process.

The iterative reconstruction process performed by the iterative reconstruction processor 30 terminates when a suitable stopping criterion is satisfied. In some embodiments, the stopping criterion is based on the image correction when the image correction 75 becomes sufficiently close to unity (for a ratio-based correction, this corresponds to the amount of correction being sufficiently small), the iterating terminates. In other embodiments, the stopping criterion is a fixed number of iterations—for example, the reconstruction processor 30 may perform four iterations and then stop. In these embodiments, the fixed number of iterations is suitably selected based on prior experience with the rate of convergence provided by the iterative reconstruction processor 30.

The illustrated reconstruction processor 30 is an example. In some other contemplated embodiments, the comparator is applied at the image level—for example, estimated data that is backprojected to form an estimated image is suitably compared with corresponding backprojected measured projection data. In some embodiments, the parallel paths corresponding to different energies are optionally different back-projection paths, rather than the illustrated different forward projection paths 44, 46. Moreover, the various elements of the iterative backprojector, such as the combiner 48, the adjuster 76, and so forth can employ different processing algorithms. As noted previously, the number of parallel paths can be other than the illustrated two paths. Moreover, it will be appreciated that the iterative reconstruction processor 30 is also applicable to imaging using a radiopharmaceutical that emits only a single main emission peak, for example by setting the energy ratio 50 to a value E1:E2 equals 1:0 and setting the E1 energy-dependent parameters 52, 54, 56 to values corresponding to the single main emission peak of the radiopharmaceutical.

As a computational example, an embodiment of the iterative reconstruction processor 30 which uses modified maximum likelihood-expectation maximization (MLEM) processing is set forth. The conventional MLEM reconstruction is suitably expressed as:

$$\lambda_i^{n+1} = \lambda_i^n \frac{\sum_j w_{ij} \frac{p_j}{\sum_l w_{lj}\lambda_l^n}}{\sum_j w_{ij}}, \quad (1)$$

where $\lambda_i^n$ is the current ($n^{th}$) estimate of the image at voxel i, $p_j$ is the measured projection data at j, and $w_{ij}$ is the probability that a photon emitted from voxel i is being detected at position j at the detector. To implement the parallel paths 44, 46 of the iterative reconstruction processor 30, the forward projection portion of Equation (1) is expressed as a sum of the projections over energy $\epsilon$, for a given angle $\theta$. That is, the sum over the assembly of re-projection elements (P), at iteration n, is:

$$P_j^n = \sum_l w_{lj}\lambda^n = \sum_\epsilon \{P_{\epsilon,\theta=0}^n, P_{\epsilon,\theta=1}^n, \ldots\}. \quad (2)$$

The contribution to the projection at $\theta$ of photons with energy $\epsilon$ is given by:

$$P_{\epsilon\theta}^n = \sum_z h_{xy}(z) \otimes \left( \sum_{\gamma \in \epsilon} A_{\gamma\theta}\{\alpha_\gamma \lambda_\theta^n\}\tau_{\gamma\epsilon} + A_{\epsilon\theta}\{(S_\epsilon \otimes \lambda_\theta^n)\}\tau_{\epsilon\epsilon} \right), \quad (3)$$

Where $\lambda_\theta$ is $\lambda$ rotated by $\theta$ so that the detector plane is at z=0, $h_{xy}(z)$ is the depth-dependent blurring kernel at depth z, $S_\epsilon$ is the generalized scatter kernel for energy $\epsilon$, $\tau_{\epsilon\gamma}$ is the energy dependent detector efficiency of photons of energy $\gamma$ at energy window $\epsilon$, $\alpha_\gamma$ is the branching ratio of the isotope into energy $\gamma$ (the branching ratio $\alpha_\gamma$ corresponds to the energy ratio 50 of the reconstruction processor 30 but is generalized to three or more parallel energy paths—for two energies $\gamma_1$ and $\gamma_2$, the energy ratio 50 is suitably given by $\alpha_{\gamma 1}:\alpha_{\gamma 2}$) and A is the attenuation operator, given by:

$$A_\gamma\{\lambda(x, y, z)\} = \lambda(x, y, z)e^{-D\sum_{l=0}^{z-1}\mu_\gamma(x,y,l)}, \quad (4)$$

where D is the voxel size in z direction, and $\mu$ is the attenuation coefficient at the energy $\gamma$. Equations (1)-(4) enable estimation of the contribution to each measured projection from the original photon distribution as well as the distribution due to scattered photons.

In the foregoing, it has been assumed that a single radiopharmaceutical including one or more radioisotopes attached to a common carrier is administered to the imaging subject. In this case, the radioemissions at the two or more emission peak energies emanate from the same distribution of radiopharmaceutical. That is, the spatial distribution of the radioemissions at each emission peak energy is the same, corresponding to the distribution of the radiopharmaceutical in the imaging subject.

If the subject is administered two or more different radiopharmaceuticals, then this assumption of a common distribution of radioemissions may be inexact. For example, consider imaging of a human subject in which a first administered radiopharmaceutical emits at a first peak energy and concentrates in the blood, while a second administered radiopharmaceutical emits at a second peak energy different from the first energy peak and concentrates in the coronary tissue. In this case, the distribution of radioemissions of the first peak energy corresponds to the distribution of blood, while the distribution of radioemissions of the second peak energy corresponds to the distribution of coronary tissue.

In some imaging techniques, it is contemplated to employ two or more different radiopharmaceuticals each targeting a functional or molecular compartment and each emitting photons at different peak energies. Projection data from both administered radiopharmaceuticals is simultaneously acquired, and the reconstruction processor 30' is applied to simultaneously reconstruct images of both radiopharmaceutical distributions so as to simultaneously and distinguishably image the different functional or molecular compartments. It is contemplated that one or more of the administered radioisotopes can have two or more energy peaks.

Figure 2:
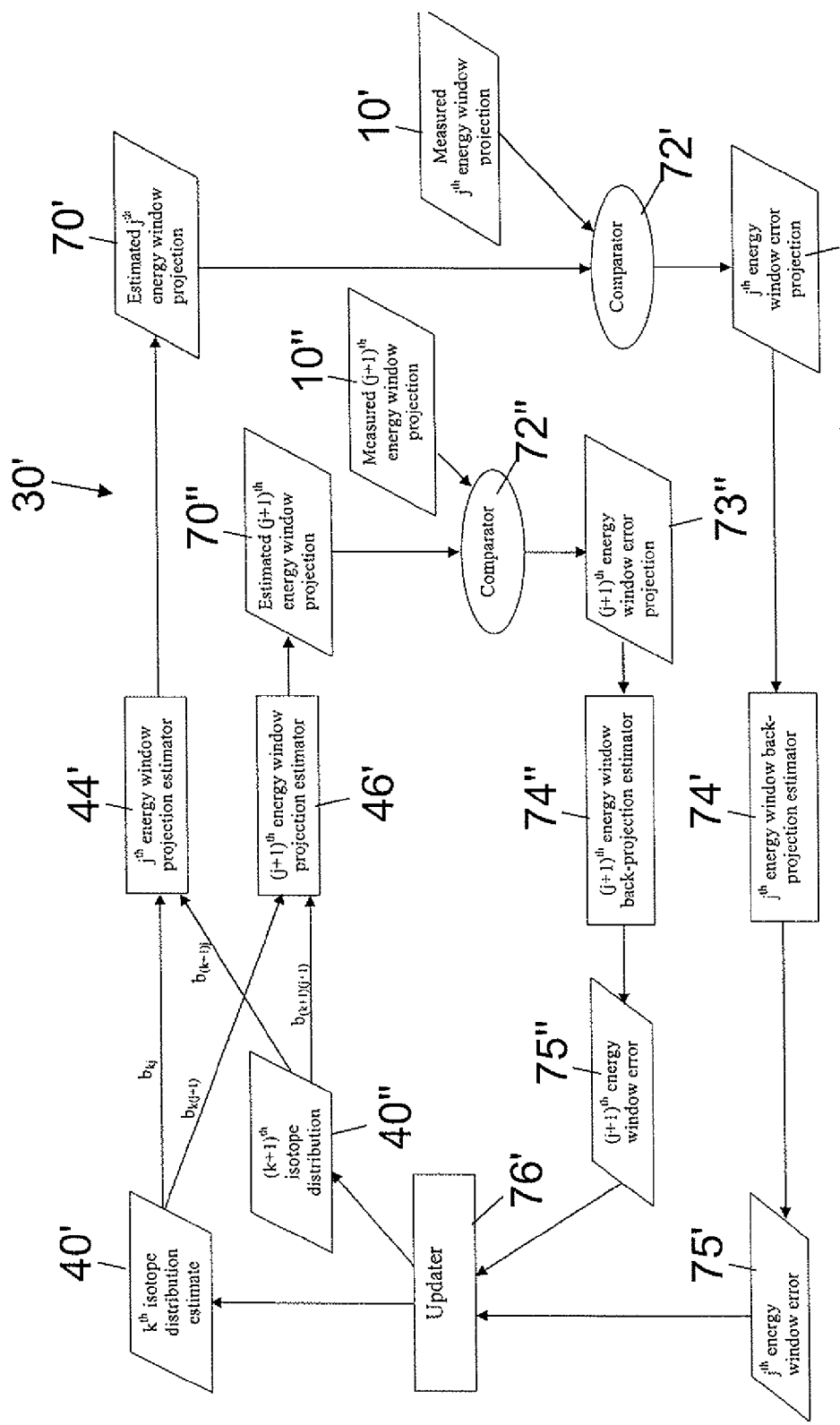
FIG. 2 diagrammatically shows another reconstruction processor for performing iterative image reconstruction of measured data acquired from a subject having been administered two or more radiopharmaceuticals.

With reference to FIG. 2, a modified iterative reconstruction processor 30' is configured to address the situation in which two or more different radiopharmaceuticals are administered to the imaging subject, with each administered radiopharmaceutical emitting at one or more photon energies such that the distribution of radioemissions for at least two peak energies differ. In FIG. 2, the index k indexes isotope distributions (corresponding to different radiopharmaceutical distributions) while the index j indexes different energy peaks. The estimated image 40 of the iterative reconstruction processor 30 is broken into two different estimated images 40', 40" corresponding to different isotope distributions. Starting from upper left of FIG. 2, the contribution to each energy window from all isotopes are extracted from the currently estimated isotope distributions 40', 40" according to the branching ratios $b_{kj}$, $b_{k(j+1)}$, $b_{(k+1)j}$, $b_{(k+1)(j+1)}$ of each isotope. Then the summed energy window estimate is projected using the projection estimators 44', 46' for the energy window. The generated estimated projection data 70', 70" are compared by comparators 72', 72" with the corresponding measured projection data 10', 10" which is broken into two sets due to the different isotope distributions. The error projections 73', 73" for the energy window are backprojected using the corresponding backprojection estimators 74', 74". The back-projected error estimates 75', 75" for all the energy windows are consolidated by the adjuster 76' for each isotope and the distribution estimate 40', 40" for each isotope is updated accordingly.

The imaging systems, image reconstruction processors, and imaging techniques disclosed herein can be embodied in various ways. For example, a processor may be programmed to perform one or more of the disclosed image reconstruction methods. Such a processor may be a programmable digital processor, microprocessor, controller, microcontroller, or so forth executing suitable software. A digital storage medium may be provided which encodes instructions which when executed by such a processor performs one or more of the disclosed reconstruction methods. The digital storage medium may be, for example, a magnetic disk, an optical disk, random access memory (RAM), a non-volatile or battery-backed electronic memory such as a FLASH memory, programmable read-only memory (PROM), or so forth. It is also contemplated to implement the reconstruction techniques disclosed herein partially or completely using analog circuitry. For example, an application-specific integrated circuit (ASIC) can include dedicated analog and/or digital circuitry configured to perform one or more of the disclosed reconstruction methods. Such a processor, digital storage medium, ASIC, or so forth can be a stand-alone component that receives and processes measured projection data from a remote gamma camera or other scanner, or can be integrated with a suitable gamma camera or other scanner.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having described the preferred embodiments, the invention is now claimed to be:

1. An imaging method comprising:
    iteratively projecting and backprojecting estimated data, the iterative projecting and backprojecting including projecting or backprojecting the estimated data along parallel paths each parallel path employing one or more energy-dependent parameters appropriate for a different energy, the iterative projecting and backprojecting further comprising combining results of the parallel paths based on an energy ratio; and
    during each iteration, adjusting the estimated data based on comparison of the estimated data with measured data.

2. An imaging method comprising:
    iteratively projecting and backprojecting estimated data, the iterative projecting and backprojecting including projecting or backprojecting the estimated data along parallel paths, each parallel path employing one or more energy-dependent parameters appropriate for a different energy, wherein each iteration of the iterative projecting and backprojecting includes:
        forward projecting an estimated image along the parallel paths, each parallel path employing one or more energy-dependent parameters appropriate for a different energy, and combining results of the parallel paths based on an energy ratio to generate estimated projection data;
        backprojecting a comparison of the estimated projection data with the measured data to generate an image correction; and
        adjusting the estimated image using the generated image correction, and
    during each iteration, adjusting the estimated data based on comparison of the estimated data with measured data.

3. The imaging method as set forth in claim 2, wherein the one or more energy-dependent parameters of each parallel path include at least one of (i) an energy-dependent scattering parameter, (ii) an energy-dependent attenuation parameter, (iii) an energy-dependent detector efficiency parameters, (iv) a collimator response parameter, (v) a lead x-ray correction parameter due to collimator material, and (vi) a scattering correction parameter for correcting for scattering within the detector.

4. The imaging method as set forth in claim 2, further including:
    making a parameter correction to the estimated projection data after the combining of the results of the parallel paths.

5. The imaging method as set forth in claim 2, wherein the parallel paths include first and second parallel paths corresponding to first and second different peak energies emitted by a radiopharmaceutical.

6. The imaging method as set forth in claim 2, further including:
    administering a radiopharmaceutical to a subject, the radiopharmaceutical including a radioisotope emitting at two or more different photon energies corresponding to the parallel paths of the iterative projecting and backprojecting; and
    measuring radiopharmaceutical emissions from the subject after administering the radiopharmaceutical to generate the measured data used for the adjusting.

7. The imaging method as set forth in claim 1, wherein the energy-dependent parameters of the parallel paths include at least one of an energy-dependent scattering parameter, an energy-dependent attenuation parameter, and an energy-dependent detector efficiency parameters.

8. The imaging method as set forth in claim 1, wherein the adjusting includes
    adjusting an estimated image based on an image correction generated by the comparison of the estimated data with measured projection data.

9. The imaging method as set forth in claim 1, further including:
    administering two or more radiopharmaceuticals to a subject, each administered radiopharmaceutical emitting at one or more photon energies, the parallel paths of the iterative projecting and backprojecting corresponding to the different photon energies of the two or more radiopharmaceuticals; and measuring radiopharmaceutical emissions from the subject after administering the radiopharmaceutical to generate the measured data used for the adjusting.

10. The imaging method as set forth in claim 9, wherein the administered two or more radiopharmaceuticals have generally different spatial distributions in the subject, and the iterative projecting and backprojecting further includes:

iteratively projecting and backprojecting a different set of estimated data for each radiopharmaceutical, the iterative projecting and backprojecting including projecting or backprojecting the different sets of estimated data along the parallel paths.

11. The imaging method as set forth in claim 1, further including:

administering a radiopharmaceutical to a subject, the radiopharmaceutical emitting at two or more different photon energies corresponding to the parallel paths of the iterative projecting and backprojecting; and measuring radiopharmaceutical emissions from the subject after administering the radiopharmaceutical to generate the measured data used for the adjusting.

12. The imaging method as set forth in claim 11, wherein the measuring includes:

acquiring single photon emission computed tomography (SPECT) data from the subject after administering the radiopharmaceutical.

13. A non-transitory computer medium or processor programmed to perform the method of claim 1.

14. An imaging system comprising:

a radiation detector for acquiring measured data from a subject after having administered to the subject a radiopharmaceutical emitting at two or more different photon energies; and a reconstruction processor for performing an image reconstruction process including:

(i) iteratively projecting and backprojecting estimated data, the iterative projecting and backprojecting including projecting or backprojecting the estimated data along parallel paths parallel path employing one or more energy-dependent parameters appropriate for a different energy, and combining results of the parallel paths, and (ii) during each iteration, adjusting the estimated data based on comparison of the combined results of the parallel paths with the measured data acquired by the radiation detector.

15. The imaging system as set forth in claim 14, wherein the radiation detector includes:

a gamma camera for acquiring tomographic projection data.

16. A reconstruction processor programmed to iteratively reconstruct an image from unsorted measured projection data that is not sorted by energy, each iteration including (i) projecting and backprojecting estimated data, including projecting the estimated data along parallel paths with each parallel path employing one or more energy dependent parameters appropriate for a different energy, (ii) combining the projected data from the parallel paths to produce combined projection data, and (iii) adjusting the estimated data based on comparison of the combined projection data with the unsorted measured projection data.

17. The reconstruction processor as set forth in claim 16, wherein the projecting or backprojecting comprises projecting an estimated image along the parallel paths to produce projected data, and the adjusting includes:

adjusting the estimated image based on comparison of the combined projection data with measured projection data.

18. A non transitory digital storage medium encoding instructions which when executed by a processor perform reconstruction processing operations including (i) projecting and backprojecting estimated data, at least one of the projecting and backprojecting of the estimated data being along parallel paths, each parallel path employing one or more energy dependent parameters appropriate for a different energy and combining the results of the parallel paths to generate combined projected or backprojected estimated data and (ii) adjusting the estimated data based on comparison of the combined projected or backprojected estimated data with measured data.

* * * * *